United States Patent
Kim

(10) Patent No.: US 12,370,027 B2
(45) Date of Patent: *Jul. 29, 2025

(54) FIVE-AXIS ARTIFICIAL TOOTH PROCESSING MACHINE USING LINEAR MOTOR

(71) Applicant: ZEUS TECH CO., LTD., Gangwon-do (KR)

(72) Inventor: Hong Youn Kim, Gangwon-do (KR)

(73) Assignee: ZEUS TECH CO., LTD., Gangwon-do (KR)

( * ) Notice: Subject to any disclaimer, the term of this patent is extended or adjusted under 35 U.S.C. 154(b) by 794 days.

This patent is subject to a terminal disclaimer.

(21) Appl. No.: 17/592,529

(22) Filed: Feb. 4, 2022

(65) Prior Publication Data

US 2023/0248486 A1 Aug. 10, 2023

(51) Int. Cl.
*A61C 13/00* (2006.01)
*H02K 41/03* (2006.01)

(52) U.S. Cl.
CPC ........ *A61C 13/0004* (2013.01); *H02K 41/031* (2013.01); *H02K 2201/18* (2013.01)

(58) Field of Classification Search
None
See application file for complete search history.

(56) References Cited

U.S. PATENT DOCUMENTS

| | | | |
|---|---|---|---|
| 6,905,293 B1* | 6/2005 | Filser ................ | A61C 13/0009 409/98 |
| 7,228,197 B2* | 6/2007 | Walter .................. | B23Q 17/10 702/34 |
| 10,743,970 B2* | 8/2020 | Steger ................. | B23Q 39/028 |
| 2009/0129882 A1* | 5/2009 | Tchouprakov ..... | B23Q 17/0971 433/25 |
| 2015/0352679 A1* | 12/2015 | Yamamoto ............ | B23Q 17/00 73/865.8 |

(Continued)

FOREIGN PATENT DOCUMENTS

KR 10-2016-0101190 A 8/2016

OTHER PUBLICATIONS

Presentation M2 Dual with DT AlexanderL, High Dental Korea, Dec. 2020, <https://www.youtube.com/watch?v=CkpEXI6ZRjs&t=46s>.

(Continued)

*Primary Examiner* — Howard Cortes
(74) *Attorney, Agent, or Firm* — Revolution IP, PLLC

(57) ABSTRACT

A five-axis artificial tooth processing machine includes a work bed portion on which a base tooth material selected from a titanium material and a zirconia material is fixedly installed and in which a wet die configured to process a titanium material and a dry die configured to process a zirconia material are arranged to be comparted from each other, a processing tool portion having one end on which a driving spindle to which a processing tool is coupled is provided to process the base tooth material while approaching or moving away from the base tooth material, a linear motor portion configured to transfer the driving spindle in an X-axis direction or a Z-axis direction, and a spindle monitoring portion provided on the processing tool portion and configured to monitor revolutions per minute (RPM), the vibrational degree of the driving spindle, and a temperature/humidity of the work bed portion.

5 Claims, 8 Drawing Sheets

(56) References Cited

U.S. PATENT DOCUMENTS

| | | | | |
|---|---|---|---|---|
| 2018/0353271 A1* | 12/2018 | Steger | ................ | B23Q 11/0891 |
| 2019/0209266 A1* | 7/2019 | Moon | ................... | B23Q 11/10 |
| 2020/0380845 A1* | 12/2020 | Onose | ................... | G08B 21/18 |
| 2021/0286348 A1* | 9/2021 | Jalluri | ................ | G05B 19/4063 |
| 2021/0346099 A1* | 11/2021 | Chen | ....................... | B25J 9/1671 |
| 2022/0164704 A1* | 5/2022 | Sugiura | ............... | G06F 18/2323 |
| 2022/0226083 A1* | 7/2022 | Stark | ....................... | A61C 19/00 |
| 2022/0252482 A1* | 8/2022 | Hashizume | ............. | F16C 19/52 |
| 2022/0378560 A1* | 12/2022 | Schneider | ............ | A61C 13/083 |
| 2022/0410332 A1* | 12/2022 | Sakurai | ................ | G05B 23/024 |
| 2023/0051489 A1* | 2/2023 | Onose | ................. | G05B 19/406 |

OTHER PUBLICATIONS

Monitoring Solutions For Cutting Machines. Marposs.[online], Jan. 31, 2016, <https://www.marposs.com/>.

\* cited by examiner

FIVE-AXIS ARTIFICIAL TOOTH PROCESSING MACHINE USING LINEAR MOTOR

BACKGROUND

1. Field of the Invention

The present invention relates to a five-axis artificial tooth processing machine using a linear motor, and more particularly, to a five-axis artificial tooth processing machine using a linear motor in which high thrust, highly precise control, and real-time monitoring are possible using the linear motor.

2. Discussion of Related Art

Among medical apparatuses, a dental medical apparatus is a medical apparatus used for dental treatment that is one field of medicine in which a disease, an abnormal state, or the like in a maxillofacial region including teeth, peripheral tissue thereof, and an oral cavity is prevented, diagnosed, and treated. The dental material field occupies so great a proportion in the medical equipment field that it is designated as a separate field.

Also, in dental computer-aided design/computer aided manufacturing (CAD/CAM), installations necessary for a dental treatment process, for example, a prosthesis, a dental restoration material, an orthodontic appliance, a stent, and the like, may be three-dimensionally scanned using a computer and a dental prosthesis may be directly designed on the computer (CAD) and precisely cut using a processing machine (CAM) to be manufactured.

As a dental processing machine, and particularly, as an artificial tooth processing machine, a variety of processing apparatuses such as a turning, a machining center, a computer numerical control (CNC) lathe, and the like have been developed. Although mechanical properties of an artificial tooth such as the rigidity and the like are the most important parts of the corresponding artificial tooth processing machine, it is also necessary to secure processing precision for reducing discomfort by minimizing processing errors. Also, high thrust of a processing machine is necessary to appropriately process a highly rigid material represented by zirconia, titanium, and the like, which are difficult to cut, without vibration.

However, in the case of most conventional artificial tooth processing machines, since a transfer portion configured to transfer or move a spindle uses a rotational type driving actuator such as an alternating current (AC) servomotor, a brushless direct current (BLDC) motor, or the like, transfer accuracy and thrust are necessarily decreased. Accordingly, a processing tool connected to the transfer portion is directly influenced, which degrades precision of processing and increases vibration during processing.

Also, in the case of conventional processing machines, since the degree of abrasion, a damaged state, or alignment of a processing tool is recognized with the naked eye and the processing tool is replaced or a balancing operation is performed depending on the level of skill of a worker, maintenance and repair costs and the number of operations necessarily increase and tooth processing productivity and quality are negatively influenced.

Also, since wet cutting is required in the case of titanium which is a representative material of abutment and dry cutting is performed in the case of zirconia, when these materials are processed, due to differences in processing environments, a processing machine intermittently processes or performs multiple processes in parallel, and therefore a tact time increases and it is difficult to process a variety of materials at the same time.

SUMMARY OF THE INVENTION

The present invention is directed to providing a five-axis artificial tooth processing machine using a linear motor in which a processing tool is driven using the linear motor instead of a conventional rotational type driving actuator, and therefore it is possible to provide high precision, to suppress vibration during processing, and to quickly and easily recognize an abrasion degree, damage state, or alignment of the processing tool so that predictive diagnosis such as a replacement time, rebalancing, or the like is possible, maintenance costs and the number of operations can be reduced, and productivity and quality of processing an artificial tooth can be improved.

According to an aspect of the present invention, there is provided a five-axis artificial tooth processing machine using a linear motor. The five-axis artificial tooth processing machine includes a work bed portion on which a base tooth material selected from a titanium material and a zirconia material is fixedly installed and in which a wet die configured to process a titanium material and a dry die configured to process a zirconia material are arranged to be comparted from each other, a processing tool portion having one end on which a driving spindle to which a processing tool is coupled is provided to process the base tooth material while approaching or moving away from the base tooth material, a linear motor portion configured to transfer the driving spindle in an X-axis direction or a Z-axis direction, and a spindle monitoring portion provided on the processing tool portion and configured to monitor revolutions per minute (RPM), a vibrational degree of the driving spindle, and a temperature/humidity of the work bed portion.

The spindle monitoring portion may include a predictive diagnosis sensor portion attached to an upper end of the processing tool portion.

The predictive diagnosis sensor portion may include a temperature/humidity sensor configured to sense the temperature/humidity of the outside and the temperature/humidity of the work bed portion and a frequency sensor configured to sense the RPM and the vibrational degree of the driving spindle by measuring a nature frequency of the processing tool portion.

The predictive diagnosis sensor portion may be packaged in a single body, and coupling long holes may be formed in both ends of the single body.

The predictive diagnosis sensor portion may further include an impact sensor configured to sense an impact transferred to the driving spindle, a noise sensor configured to sense noise from a nature frequency, a pressure sensor configured to sense a pressure of the single body, and a tilt angle sensor.

The frequency sensor may diagnose an error depending on whether a sensed measured frequency exceeds a preset threshold.

A parameter input through the frequency sensor may be any one of a root-mean-square (RMS) value, a peak value, and fast Fourier transform (FFT) value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, one embodiment of a five-axis artificial tooth processing machine using a linear motor according to the present invention will be described in detail with reference to the attached drawings.

Figure 1:
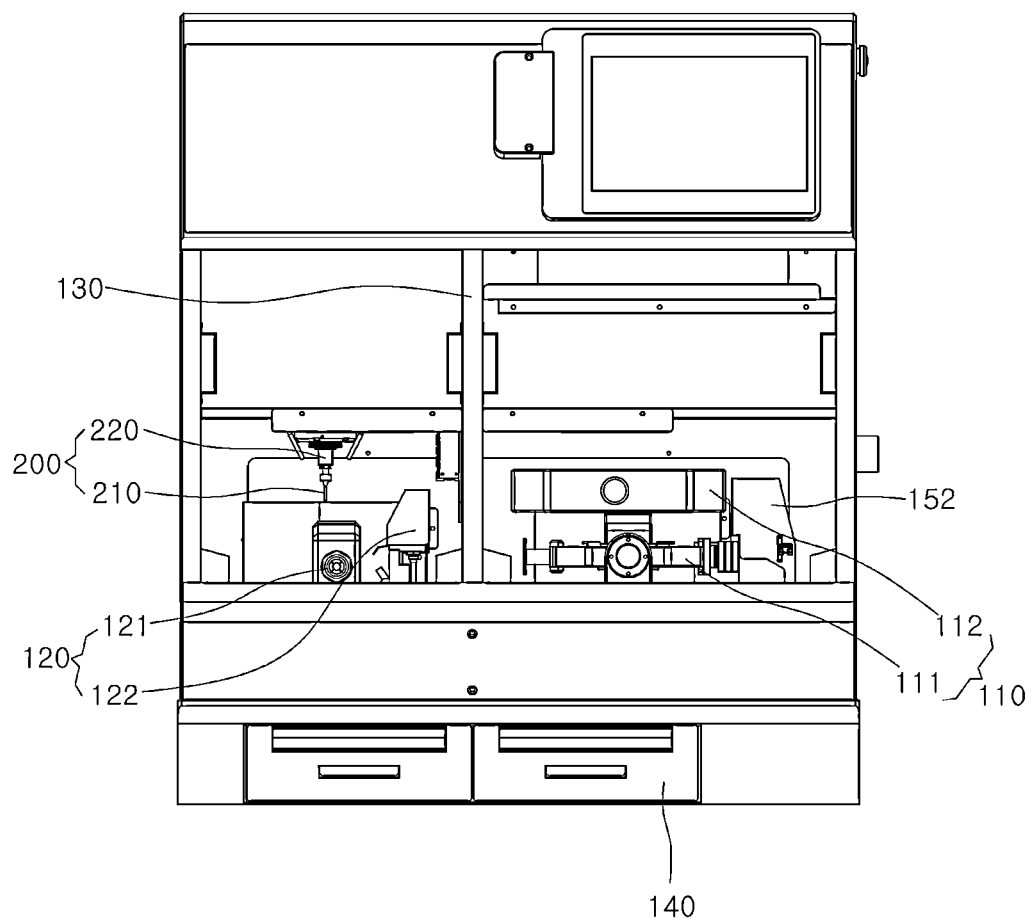
FIG. 1 is a front view of a five-axis artificial tooth processing machine using a linear motor according to one embodiment of the present invention.
Figure 2:
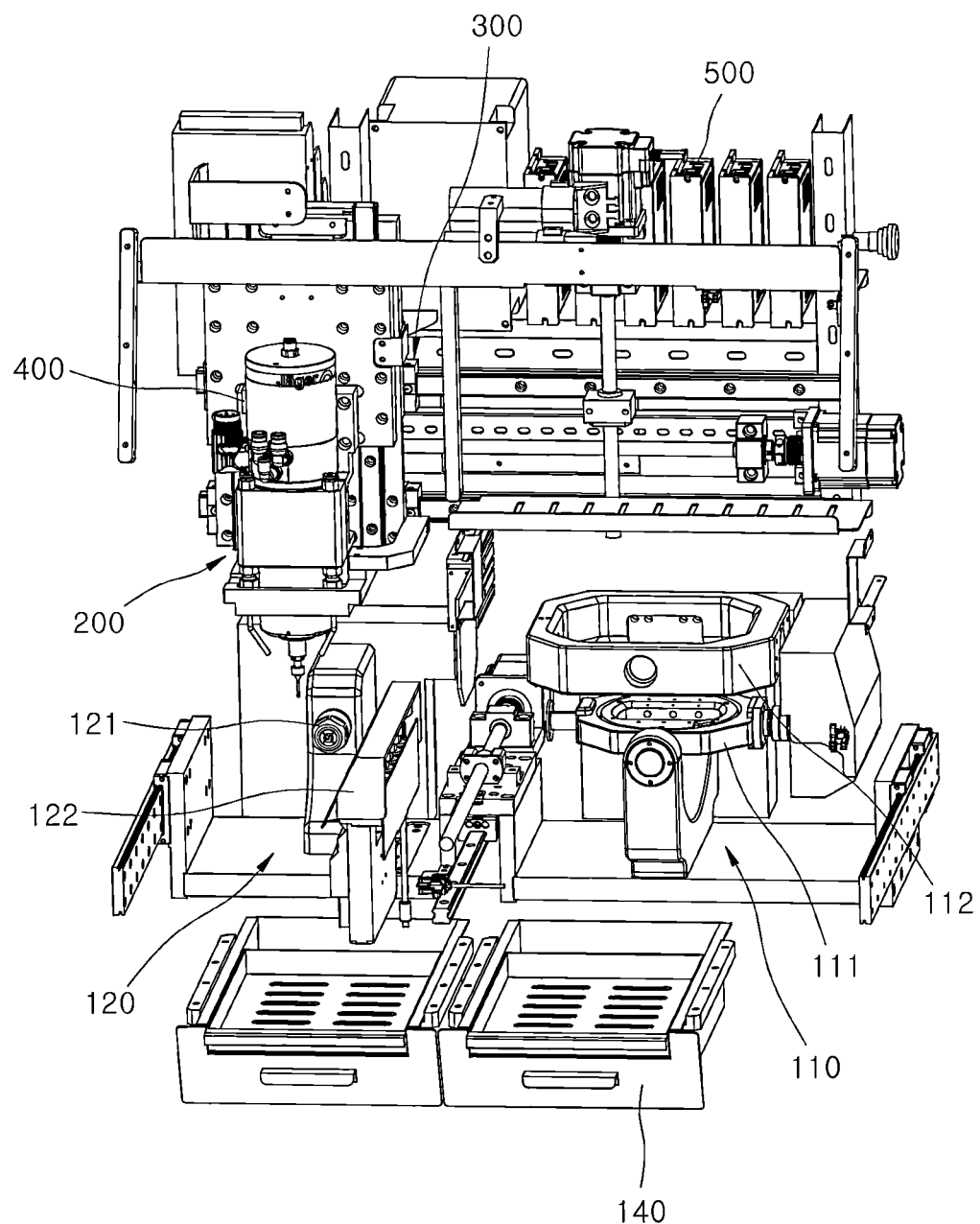
FIG. 2 is a perspective view illustrating a state in which a casing is removed from the five-axis artificial tooth processing machine using the linear motor according to one embodiment of the present invention.
Figure 3:
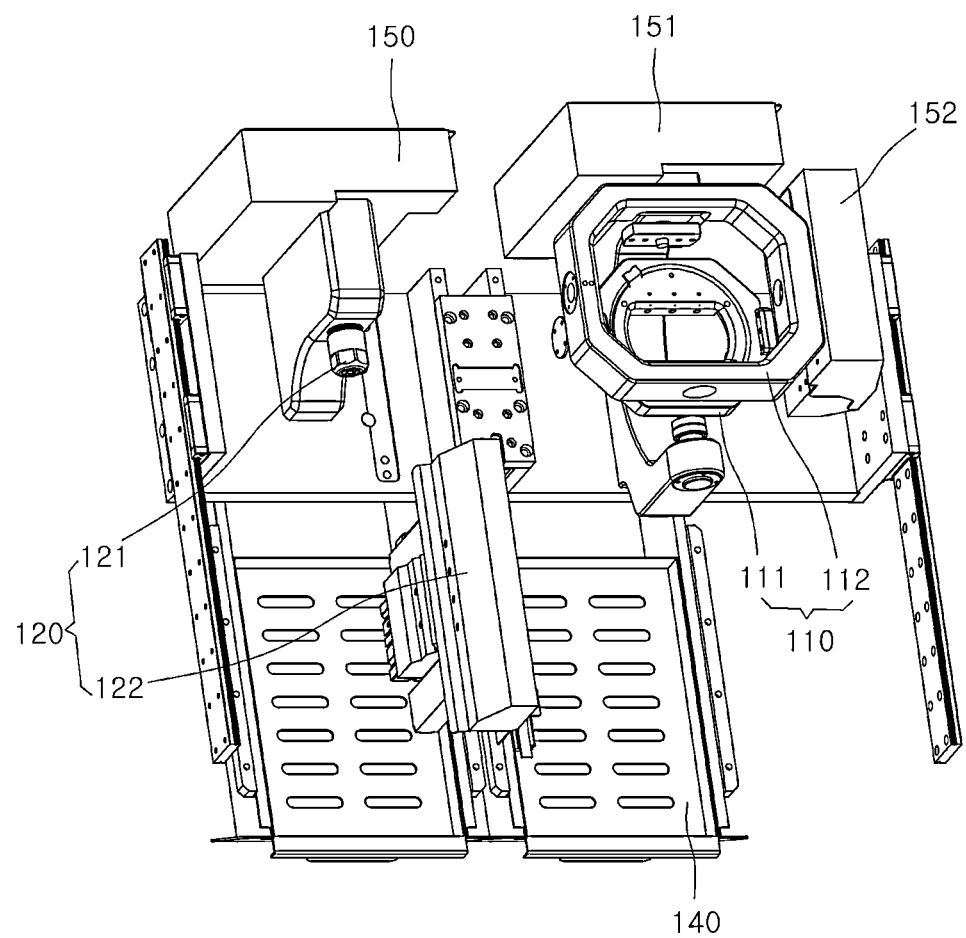
FIG. 3 is an enlarged view illustrating a work bed portion of the five-axis artificial tooth processing machine using the linear motor according to one embodiment of the present invention.
Figure 4:
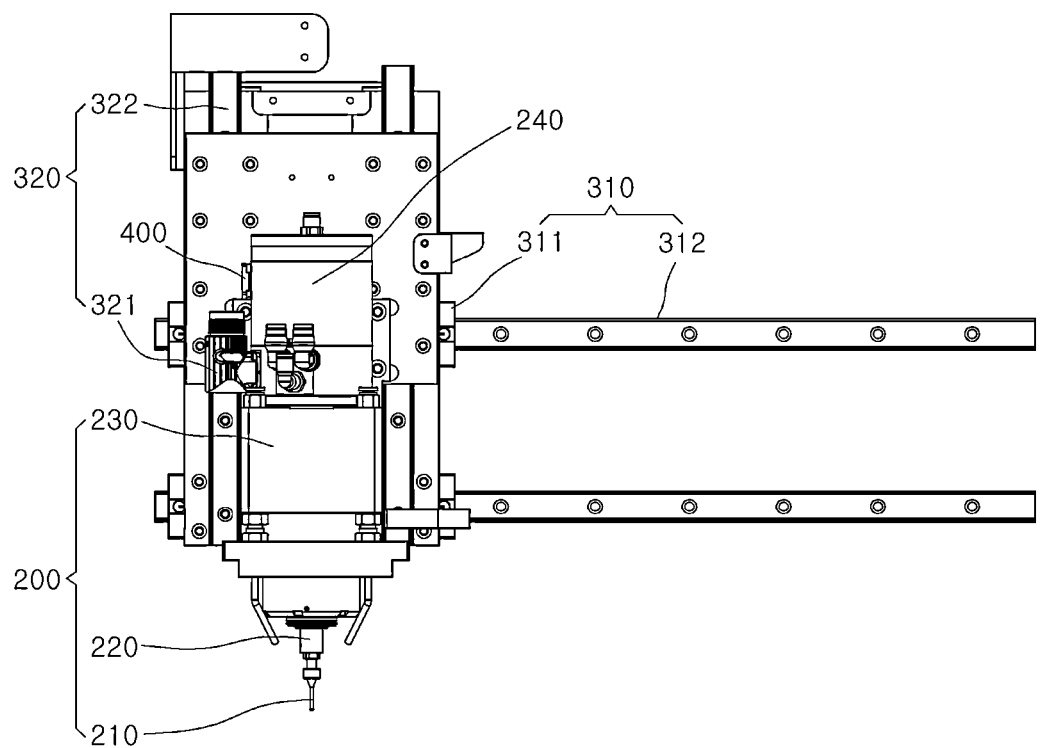
FIG. 4 is a view illustrating a state in which a spindle monitoring portion is coupled to a processing tool portion and a linear motor portion in the five-axis artificial tooth processing machine using the linear motor according to one embodiment of the present invention.
Figure 5:
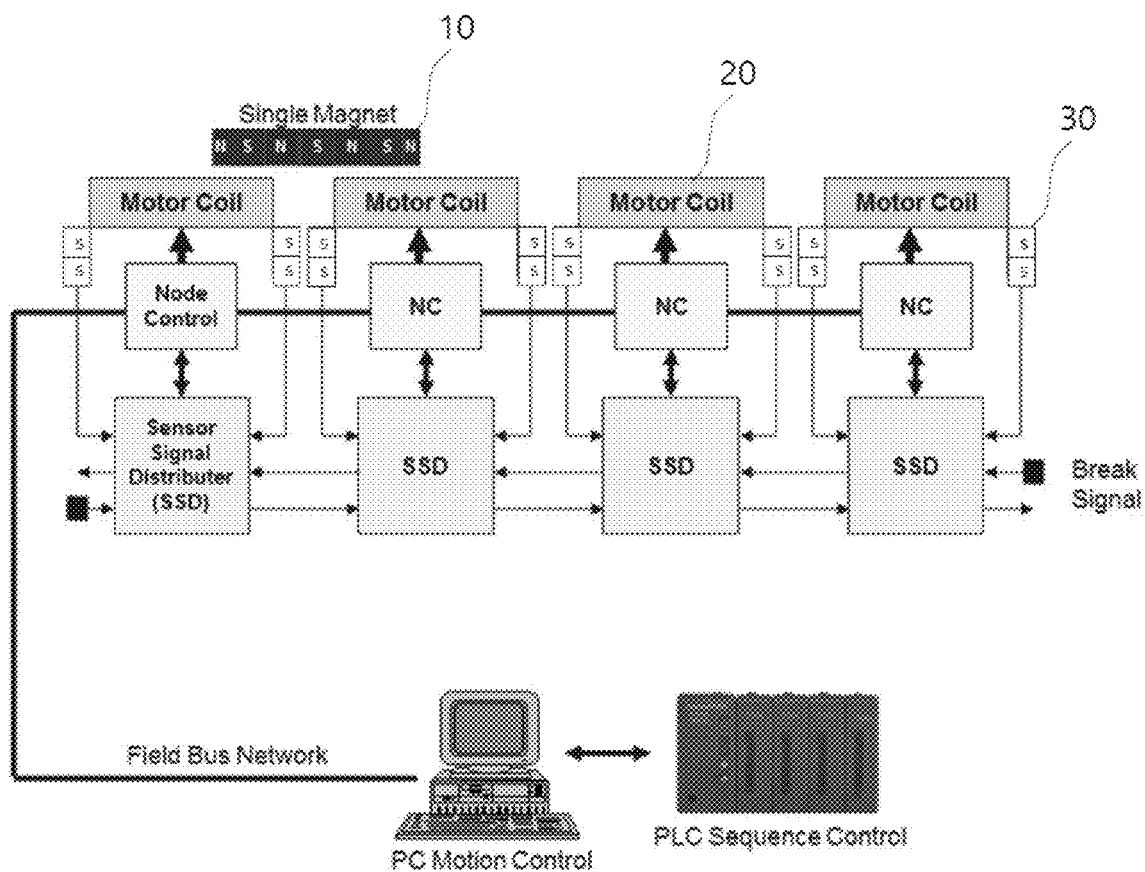
FIG. 5 is a schematic diagram illustrating basic components of the linear motor portion of the five-axis artificial tooth processing machine using the linear motor according to one embodiment of the present invention.
Figure 6:
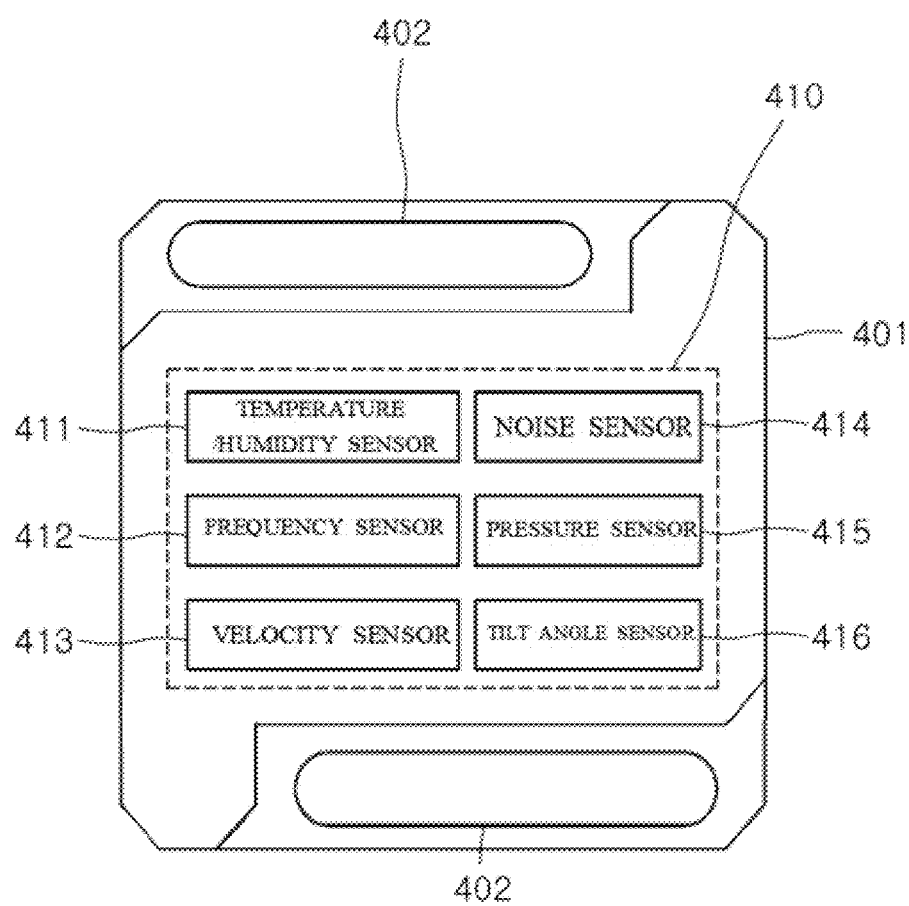
FIG. 6 is a front view illustrating the spindle monitoring portion in the five-axis artificial tooth processing machine using the linear motor according to one embodiment of the present invention.

FIG. 1 is a front view of a five-axis artificial tooth processing machine using a linear motor according to one embodiment of the present invention, FIG. 2 is a perspective view illustrating a state in which a casing is removed from the five-axis artificial tooth processing machine using the linear motor according to one embodiment of the present invention, FIG. 3 is an enlarged view illustrating a work bed portion of the five-axis artificial tooth processing machine using the linear motor according to one embodiment of the present invention, FIG. 4 is a view illustrating a state in which a spindle monitoring portion is coupled to a processing tool portion and a linear motor portion in the five-axis artificial tooth processing machine using the linear motor according to one embodiment of the present invention, FIG. 5 is a schematic diagram illustrating basic components of the linear motor portion of the five-axis artificial tooth processing machine using the linear motor according to one embodiment of the present invention, and FIG. 6 is a front view illustrating the spindle monitoring portion in the five-axis artificial tooth processing machine using the linear motor according to one embodiment of the present invention.

A five-axis artificial tooth processing machine using a linear motor according to the present invention, as shown in FIGS. 1 to 6, may include a work bed portion 100 on which a base tooth material selected from a titanium material and a zirconia material is fixedly installed and in which a wet die 120 configured to process a titanium material and a dry die 110 configured to process a zirconia material are disposed to be comparted from each other, a processing tool portion 200 having one end on which a driving spindle 220 to which a processing tool 210 is coupled is provided to process the base tooth material while approaching or moving away from the base tooth material, a linear motor portion 300 configured to transfer the driving spindle 220 in an X-axis direction or Z-axis direction, and a spindle monitoring portion 400 provided on the processing tool portion 200 to monitor revolutions per minute (RPM), a vibrational degree of the driving spindle 220, and a temperature/humidity of the work bed portion 100.

Generally, as shown in FIGS. 1 to 3, the work bed portion 100 may be provided to be divided into the wet die 120 on a left side and the dry die 110 on a right side. A central partition 130 may be disposed between the wet die 120 and the dry die 110, and a through hole (not shown) configured to allow the processing tool portion 200 to be transferred without interference may be provided in the central partition 130.

On the wet die 120, a wet jig 121, a driving portion 150, and a pickup station 122 may be provided and a titanium material to be cut with a cutting oil may be processed. Here, the titanium material may be processed as a base tooth material of an abutment to be coupled to a bottom of an artificial tooth.

Also, on the basis of FIG. 3, the dry die 110 may be provided on a right side. The dry die 110 includes a first dry jig 111 pivotable about a b-axis (with a Y-axis as a pivot center), a driving portion 151, a second dry jig 112 pivotable about an a-axis (with an X-axis as a pivot center) disposed to be perpendicular thereto, and a driving portion 152. The first dry jig 111 and the second dry jig 112 interact with each other to process an artificial tooth, and an additional fixing assembly (not shown) configured to fix a base tooth material to the first dry jig 111 may be coupled. Generally, on the dry die 110, a zirconia material that is a material for an artificial tooth may be processed.

A dust-collecting portion 140 may be provided below the dry die 110 to suction dust and chips from below.

In more detail with respect to the work bed portion 100, since it is necessary to change processing conditions according to a material and a degree of difficulty in cutting, different materials may be processed at the same time, such as a titanium material being processed on the dry die and a zirconia material being processed on the wet die.

Since a variety of materials are processed at the same time as described above, the processing machine may process continuously rather than intermittently, and productivity may be improved by eliminating an additional process and performing processing in a single process.

Generally, as shown in FIGS. 1 and 2, the processing tool portion 200 may have a fore end on which the processing tool 210 is mounted, and the processing tool 210 may be coupled to the driving spindle 220. The driving spindle 220 may be rotatably coupled by a driving motor 240 supported by a spindle bracket 230.

The processing tool portion 200 may be coupled by the linear motor portion 300 to be axially transferable. The linear motor portion 300, referring to FIG. 2, may include an X-axis transfer portion 310 and a Z-axis transfer portion 320.

The X-axis transfer portion 310 may include an X-axis linear motor 311 and an X-axis transfer rail 312, and the Z-axis transfer portion 320 may include a Z-axis linear motor 321, a Z-axis transfer rail 322, and a motor drive 500.

Here, referring to FIG. 5, the X-axis linear motor 311 and the Y-axis linear motor 321 may be formed as moving-magnet linear motors.

In more detail, the X-axis linear motor 311 and the Y-axis linear motor 321 may each include a motor portion including a stator 20 of a motor coil and an operator 10 formed of a permanent magnet plate and a sensor portion including two Hall sensors 30 for detecting an approach of the operator and for measuring the velocity and position of the operator.

The stator 20 of the motor portion may include a plurality of coils in a row in a direction in which the operator 10 moves.

Also, the sensor portion may include the two Hall sensors 30 on both ends of a coil. Also, the Hall sensors 30 may be arranged to be vertically stacked. The two Hall sensors are arranged at 90° (as a sensor module) to generate sine waves, and a rising edge signal and a falling edge signal of each of the Hall sensors 30 are set to be a velocity measurement cycle to calculate a velocity of the operator 10. The position of the operator 10 may be measured by integrating the calculated velocity.

Using the linear motor portion 300 configured as described above, the processing tool 210 is driven and operated using the linear motor instead of a conventional rotational type driving actuator so that high precision may be provided and vibration may be suppressed during a processing process.

Meanwhile, in the case of a conventional processing machine, since an abrasion degree, a damage state, or alignment of the processing tool 210 is recognized with the naked eye and the processing tool 210 is replaced or a balancing operation is performed depending on a skill level of a worker, there is a problem that maintenance and repair costs and the number of operations necessarily increase.

Accordingly, in the embodiment, the spindle monitoring portion 400 may be provided. Generally, as shown in FIGS. 4 and 6, the spindle monitoring portion 400 may include a predictive diagnosis sensor portion 410 attached to an upper end of the processing tool portion 200.

The predictive diagnosis sensor portion 410 may include a temperature/humidity sensor 411 configured to sense the temperature/humidity of the outside and the temperature/humidity of the work bed portion 100 and a frequency sensor 412 configured to sense RPM and the vibrational degree of the driving spindle 220 by measuring the nature frequency of the processing tool portion 200.

The frequency sensor 412 may diagnose an error depending on whether a sensed measured frequency exceeds a preset threshold.

The predictive diagnosis sensor portion 410 may be packaged in a single body 401, and the single body 401 may include a long coupling hole 402 for coupling.

The predictive diagnosis sensor portion 410 may further include an impact sensor 413 configured to sense an impact transferred to the driving spindle 220, a noise sensor 414 configured to sense noise from a nature frequency, a pressure sensor 415 configured to sense a pressure of the single body 401, and a tilt angle sensor 416.

A parameter input through the frequency sensor 412 may be any one of a root-mean-square (RMS) value, a peak value, and a fast Fourier transform (FFT) value of a measured frequency.

Figure 7:
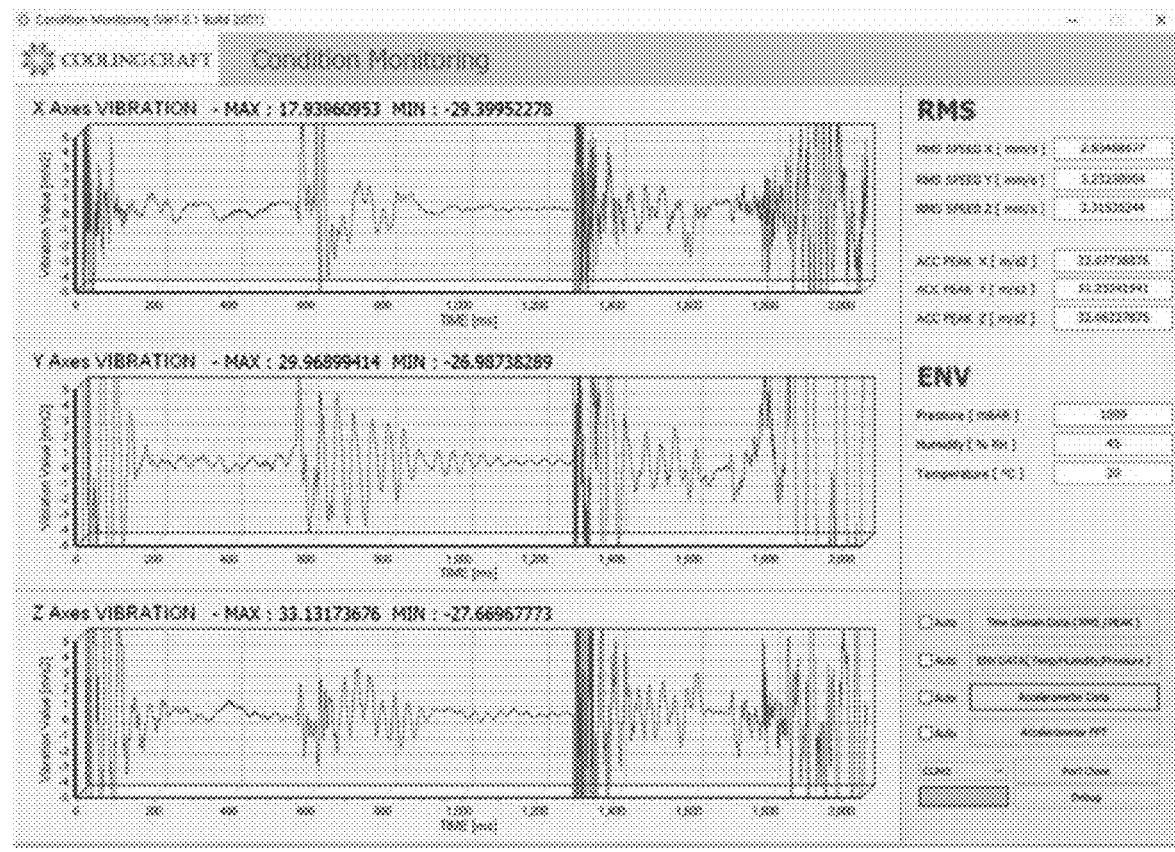
FIG. 7 is a view illustrating an example of a component configured to sense a frequency measured using the spindle monitoring portion of the five-axis artificial tooth processing machine using the linear motor according to one embodiment of the present invention.
Figure 7:
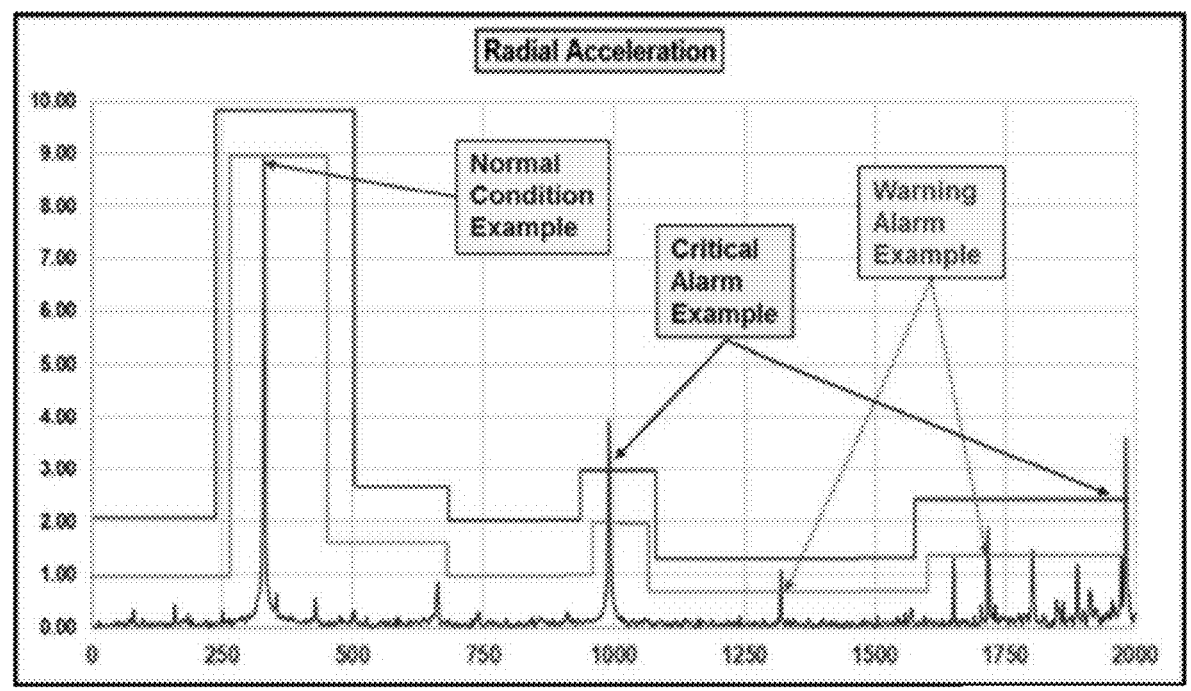
Figure 8:
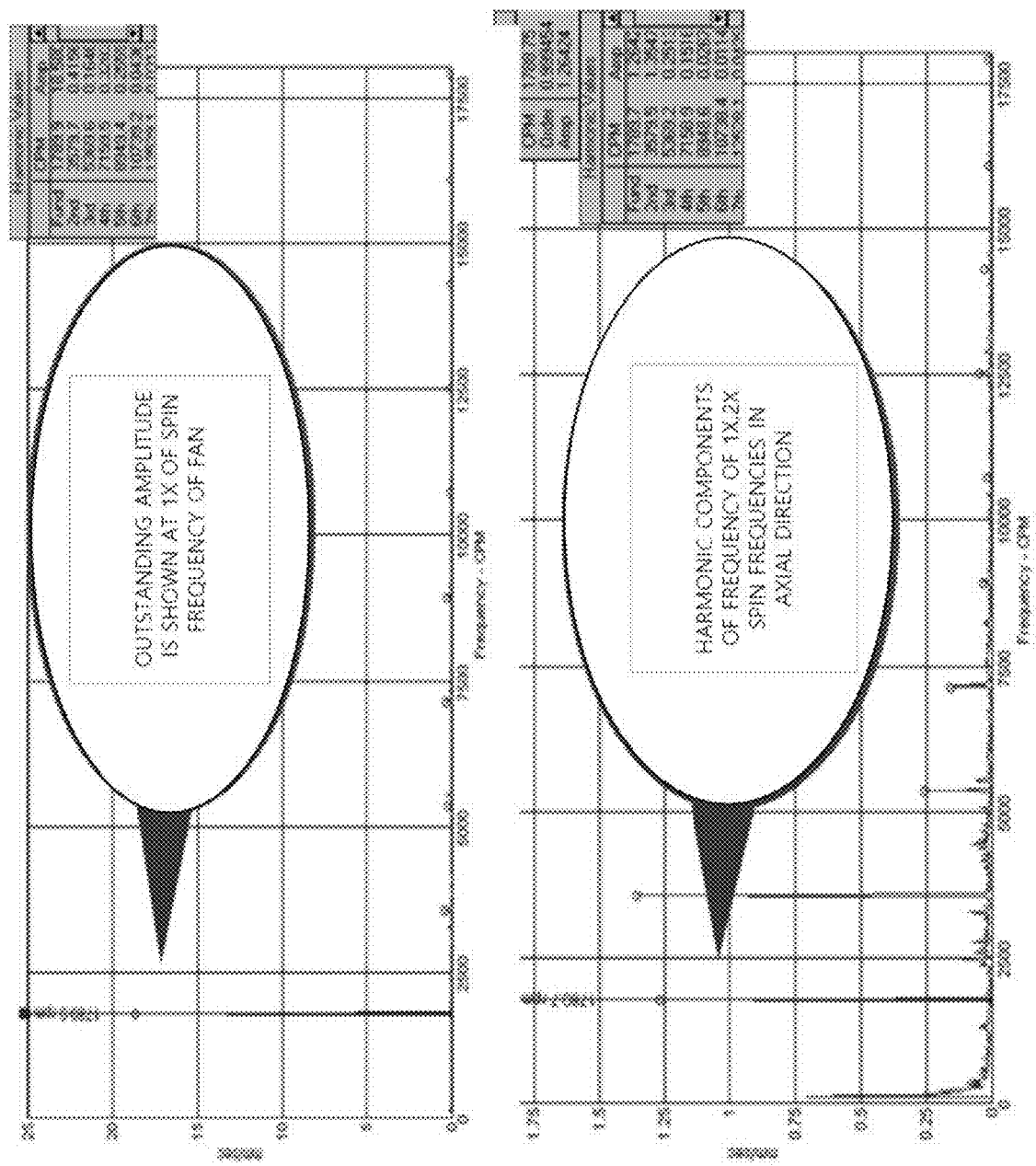
FIG. 8 is a view illustrating a screen for monitoring using a root-mean-square (RMS) value of the frequency measured using the spindle monitoring portion of the five-axis artificial tooth processing machine using the linear motor according to one embodiment of the present invention.

FIG. 7 is a view illustrating an example of a component configured to sense a frequency measured using the spindle monitoring portion 400 of the five-axis artificial tooth processing machine using the linear motor according to one embodiment of the present invention, and FIG. 8 is a view illustrating a screen for monitoring using an RMS value of the frequency measured using the spindle monitoring portion 400 of the five-axis artificial tooth processing machine using the linear motor according to one embodiment of the present invention.

Referring to FIG. 7, the frequency sensor 412 may sense vibration information of an X-axis, a Y-axis, and a Z-axis according to time. Using the frequency sensor 412, an RMS value of a measured frequency of the driving spindle 220 may be sensed by measuring a nature frequency of the processing tool portion 200. Also, it is possible to monitor whether the driving spindle 220 is at a dangerous level or has reached its replacement time using a peak value of the measured frequency.

Referring to FIG. 8, a response property of the measured frequency according to RPM of the driving spindle 220 is shown. A vibration tendency or a replacement cycle of the processing tool 210 until a dangerous situation occurs may be monitored.

Also, an error may be diagnosed depending on whether the peak value of the measured frequency at particular RPM exceeds a preset threshold.

Also, a monitoring program may be connected using an additional gateway (not shown) configured to perform transmission and reception in the predictive diagnosis sensor portion 410. Using the monitoring program, an error may be diagnosed from the sensed measured frequency and then a replacement time of the processing tool 210, rebalancing of the driving spindle 220, or the like may be predictively diagnosed and maintained.

Through the above components and operations, since the processing tool 210 is driven using the linear motor instead of a conventional rotational type driving actuator, high precision may be provided, vibration may be suppressed during processing, and an abrasion degree, damage state, or alignment of the processing tool 210 may be quickly and easily recognized. Accordingly, predictive diagnosis such as a replacement time, rebalancing, or the like may be possible, maintenance costs and the number of operations may be reduced, and productivity and quality of processing an artificial tooth may be improved.

According to the present invention, in the five-axis artificial tooth processing machine using the linear motor, since the processing tool is driven using the linear motor instead of a conventional rotational type driving actuator, high precision may be provided, vibration may be suppressed during processing, and an abrasion degree, damage state, or alignment of the processing tool may be quickly and easily recognized. Accordingly, prognostic diagnosis such as a replacement time, rebalancing, or the like may be possible, maintenance costs and the number of operations may be reduced, and productivity and quality of processing an artificial tooth may be improved.

Although an exemplary embodiment of the present invention has been described above in detail, the scope of the present invention is not limited to the particular embodiment and should be defined by the attached claims. Also, it should be noted that a variety of corrections and modifications may be made by one of ordinary skill in the art without departing from the scope of the present invention.

What is claimed is:

1. A five-axis artificial tooth processing machine using a linear motor, comprising:
- a work bed portion on which a base tooth material selected from a titanium material and a zirconia material is fixedly installed and in which a wet die configured to process the titanium material and a dry die configured to process the zirconia material are arranged to be comparted from each other;
- a processing tool portion having one end on which a driving spindle to which a processing tool is coupled is provided to process the base tooth material while approaching or moving away from the base tooth material;
- a linear motor portion configured to transfer the driving spindle in an X-axis direction or a Z-axis direction; and
- a spindle monitoring portion provided on the processing tool portion and configured to monitor revolutions per minute (RPM), a vibrational degree of the driving spindle, and a temperature/humidity of the work bed portion,
- wherein the spindle monitoring portion comprises a predictive diagnosis sensor portion attached to an upper end of the processing tool portion, and
- wherein the predictive diagnosis sensor portion comprises:
  - a temperature/humidity sensor configured to sense the temperature/humidity of the outside and the temperature/humidity of the work bed portion; and
  - a frequency sensor configured to sense the RPM and the vibrational degree of the driving spindle by measuring a nature frequency of the processing tool portion.

2. The five-axis artificial tooth processing machine of claim 1, wherein the predictive diagnosis sensor portion is packaged in a single body, and
wherein long coupling holes are formed in both ends of the single body.

3. The five-axis artificial tooth processing machine of claim 2, wherein the predictive diagnosis sensor portion further comprises:
- an impact sensor configured to sense an impact transferred to the driving spindle;
- a noise sensor configured to sense noise from a nature frequency;
- a pressure sensor configured to sense a pressure of the single body; and
- a tilt angle sensor.

4. The five-axis artificial tooth processing machine of claim 1, wherein the frequency sensor diagnoses an error depending on whether a sensed measured frequency exceeds a preset threshold.

5. The five-axis artificial tooth processing machine of claim 4, wherein a parameter of the measured frequency is any one of a root-mean-square (RMS) value, a peak value, and fast Fourier transform (FFT) value.

* * * * *